June 23, 1964 D. J. HAMMERAND 3,138,389

RECORD CHANGER TRIP

Filed July 20, 1961

INVENTOR.

Donald J. Hammerand

BY James T. Beck

ATTORNEY

United States Patent Office 3,138,389

Patented June 23, 1964

3,138,389

RECORD CHANGER TRIP

Donald J. Hammerand, Franklin Park, Ill., assignor to Admiral Corporation, Chicago, Ill., a corporation of Delaware Filed July 20, 1961, Ser. No. 125,449
6 Claims. (Cl. 274—15)

This invention relates to an improved trip mechanism for an automatic record player, and more particularly to a mechanism for initiating a record changing cycle in response to increased lateral velocity of a phonograph tone arm as it leaves the sound grooves of a standard disk record.

The present invention is an improvement on the trip mechanism disclosed in the patent to James E. Vistain, Jr., issued May 3, 1955, U.S. Patent No. 2,707,639.

The trip mechanism disclosed in the above mentioned patent to Vistain requires relatively sensitive adjustment in its assembly. Frequently, after the record player has been used for a period of time this adjustment has to be made again.

Accordingly, it is an object of the present invention to provide a trip mechanism for a record player that is easy to assemble.

Another object of the present invention is to provide a trip mechanism that will require no attention during the life of the record player.

A further object of the present invention is to provide an easily adjustable trip mechanism of economical construction.

Still another object of the present invention is to provide a record player with a trip mechanism that is reliable in operation, economical in construction and assembly, but not critical in its adjustment.

Additional objects and advantages of the present invention will be apparent from a careful reading of the accompanying specification and examination of the drawings illustrative thereof.

Figures 1, 2, 3:
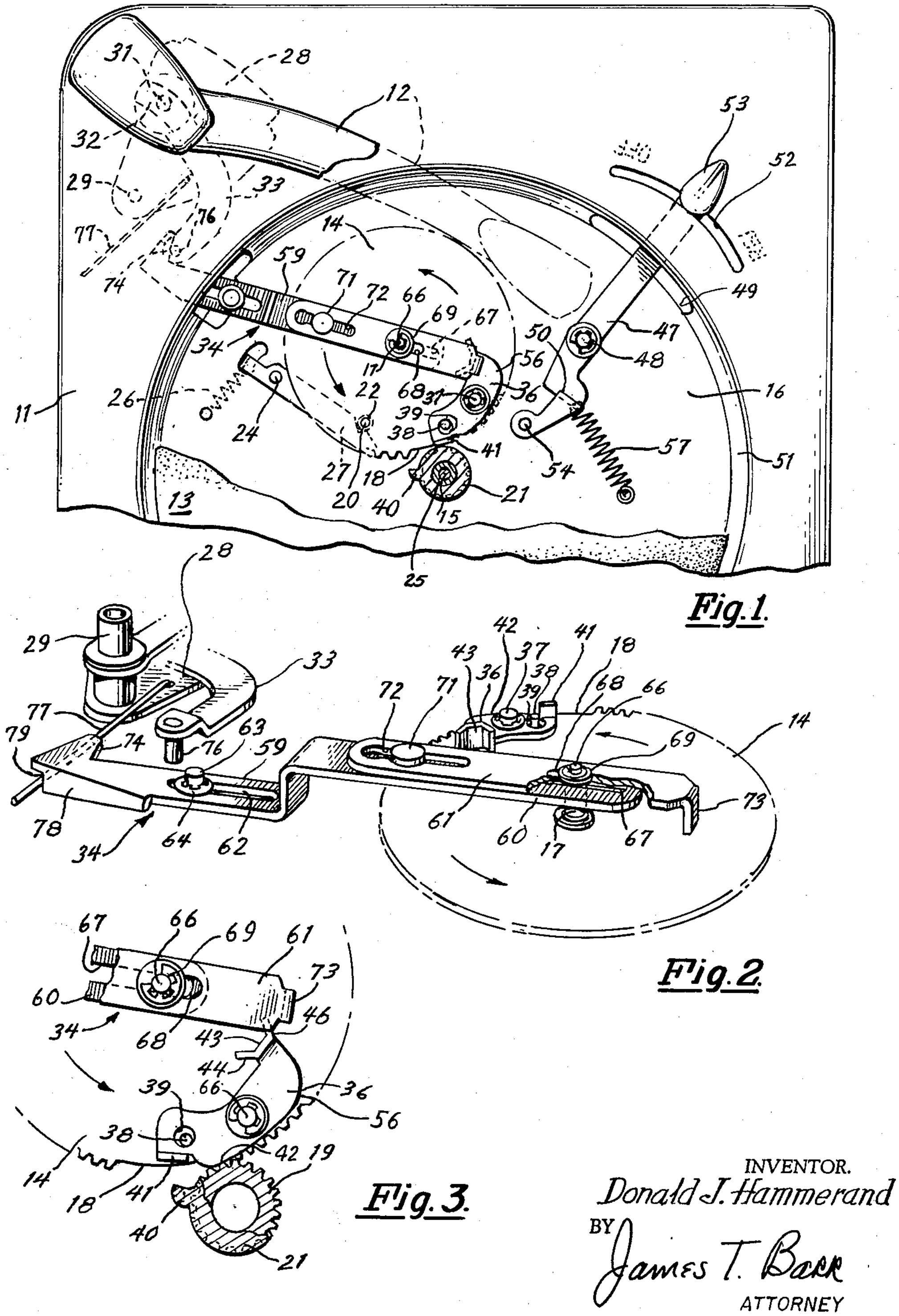
FIG. 1 is a fragmentary plan view of an automatic record player in which the trip mechanism of the present invention is incorporated, the parts being shown in the positions they occupy at the beginning of a record changing cycle.
FIG. 2 is a fragmentary perspective of the trip mechanisms shown in an intermediate position during the record changing cycle.
FIG. 3 is a fragmentary plan view of the trip mechanism, enlarged in size, and shown immediately prior to the end of the record changing cycle.

Referring now in greater detail to the accompanying drawings in which like reference numerals designate like elements, the improvements of the present invention are described as they may be applied to the record player of the above-identified Vistain patent. However, it is not intended to limit the scope of the appended claims to this particular record changer, as the principles incorporated by the present invention are obviously applicable and adaptable to record changers of other design. The illustrated embodiment of this invention comprises a base plate 11 for support of a pickup arm 12, a turntable 13, and a changing cycle gear 14. The base plate 11 is recessed to accommodate the turntable 13, which is rotatably supported thereon through a spindle 15. The spindle 15 is in turn received in a bearing member 25 mounted centrally within the recessed plate portion 16 for rotation with the turntable 13. The tone arm 12 is mounted above the base plate, while the mutilated gear 14 is mounted to the base plate beneath the turntable 13 for rotation about a pivot pin 66. The gear 14 is formed with a notch or blank space 18 from which the teeth are missing. During normal record playing operation the toothless portion 18 is disposed adjacent a hub 21 that is received by the bearing member 25 for rotation with the turntable 13. A detent pin 22 extending downwardly from the gear 14 near its periphery is received, in the record playing position, in a notch 20 in a lever 27 that is pivoted at 24 on the base plate 11. A spring 26 is attached between the base plate 11 and an opposite end of lever 27 to bias the lever into the detent pin 22.

The record changing cycle initiated by the present trip means comprises a single full revolution of the mutilated gear 14. Motions derived from the rotational movement of the gear 14 manipulate the tone arm in a predetermined manner and release records one at a time from a stack of records on the spindle 15. The linkage between the gear 14 and the tone arm 12 and the linkage between the gear 14 and the stack of records will not be disclosed in detail herein since it constitutes no part of the present invention and is fully described in the patent to Vistain referred to above. Nevertheless, it should be pointed out that a swingout mechanism 28 is provided to lift the tone arm 12 from the record and move it from the path of the next record to be dropped. This swingout mechanism 28 is pivoted to the lower side of the base plate by a pivot pin 29 and is provided with a lift pin 31 that moves up and down in response to varying positions of its associated cam 32. A crank arm 33 swings laterally below the base plate and is directly coupled rotationally to the tone arm. The trip means of the present invention is actuated, as will be seen, by the accelerated movement of the crank 33 when the pickup arm leaves the sound groove of a record.

The trip mechanism includes a compound linkage 34 and a special lever or dog 36 mounted for rotation about a pivot pin 37 that is affixed to the gear 14. The dog 36 is disposed on the gear 14 adjacent to the notch 18, and movement of the dog about its fulcrum is limited by a stop pin 38 extending upwardly from the gear 14 through a hole 39 in the dog 36. The hole 39 is substantially larger than the diameter of the pin 38, but it limits the swing of the dog within predetermined limits. The end of the dog that lies adjacent the notch 18 is formed with a projection or lug 41 extending upwardly therefrom and adapted to rotate outwardly of the gear to a position beyond the edge of the toothless notch portion 18. This outwardly projected position is referred to hereinafter as the operating position of the dog, while its inward position, horizontally within the confines of the root to root diameter of the gear 14, is referred to as the preset position of the dog. A pinion 19 is affixed to the bearing member 25 for rotation with the turntable, and a spur or striker 40 extends radially from the hub 21 just above the pinion gear 19. When the dog is in its operating position, the spur 40, moving around with the turntable, will contact the edge of the dog and initiate rotation of the gear 14. Once this rotation is initiated the pinion 19 will engage the gear teeth of the gear 14 and continue to drive it through a complete revolution until the notch portion 18 again is opposite the pinion. Upon completing the revolution the spring loaded lever 27 will again cooperate with the detent pin 22 to positively position the gear 14 in its normal inoperative position.

In its operative position, the dog's front edge or outer edge overlies the gear teeth immediately to the right of the notch 18. Thus, as the gear 14 rotates into the position where the pinion is meshing with the teeth overlain by the dog, the pinion teeth will act against the outer edge of the dog to urge the dog back to its preset position. Then, when the pinion is opposite the notch portion, the spur 40 will clear the end 41 of the dog and not initiate a second changing cycle.

The dog 36 may be moved from its preset position to its operating position by manual or automatic means. To provide for manual initiation of the record changing cycle, a lever 47 is mounted on a pivot pin 48 affixed to the sunken support plate portion 16. The lever 47 extends through the side 51 of the sunken base plate portion 16, being received in a hole 49 therein. It extends beneath the base plate to a control slot or track 52 which is adapted to guide its lateral movement. A manual control knob 53 extends upwardly through the slot 52 from the lever 47. The opposite end of the lever 47 is offset upwardly at 50. The inner end of the offset portion carries a downwardly extending follower 54 which engages the dog 36 when the lever is moved clockwise to its reject position (see FIG. 1). Normally, the lever 47 is disengaged from the dog 36 and biased into this disengaged position by a tension spring 57 which is anchored to the lever. However, when it is desired to initiate the record changing cycle the handle 53 is moved against the force of the spring 47 into engagement with the dog 36 to move it from its preset position to its operating position.

If, during the play of a record, the reject mechanism described above is not actuated manually before the sound track has been completely traversed by the tone arm, the record will be automatically rejected when tone arm 12 reaches the trip groove of the record. This is accomplished through the linkage 34 as best seen in FIG. 2. The linkage 34 comprises a carrier link 59 and a carried link 61 mounted on the carrier link. The two links 59 and 61 are slidably mounted one to another through a slot 72 in the carried link 61 and a cooperating pin 71 projecting from the carrier link 59. The link 59 is mounted on the plate 11 through a slot 62 that receives a pin 63 on the plate 11. A washer 64 retains the link 59 on the pin 63. In the region adjacent the gear, the carrier link 59 is formed with an upwardly offset section 60 to pass over the gear 14 and clear the dog 36 as the latter is carried through its course during a record changing cycle.

A post 17 provides the bearing for the pivot pin 66, and advantage is taken of the post 17 to provide additional support for the linkage 34. The post 17 passes through a slot 67 in the carrier link 59 and a comparatively short slot 68 in the carried link 61. A washer 69 is provided to retain the links on the post 17. While the pin 63 and the post 17 cooperate to provide a linear course for the link 59, the pin 71 on the link 59 and the slot 72 in the link 61 permit longitudinal movement of one link with respect to the other within limits created by the post 17 in the slot 68. The carried link 61 extends beyond the end of the carrier link and terminates in a free end which is bent downward in a depending finger 73. The drive dog 36 is provided with an upstanding flange 43 on the opposite end from the lug 41, and the flange 43 has two lateral wings 44 and 46. The depending finger 73 extends to a level below the top of the flange 43, and during normal record play it engages the flange 43 and urges the dog 36 toward its operating position. At the opposite end of the linkage 34, the link 59 is formed with a laterally projecting finger 74 arranged to cooperate with a stud 76 that extends downwardly from the end of the crank arm 33.

When the tone arm 12 is set down on a record, the flange 43 is disposed between the finger 73 and the post 17. As the tone arm moves, the finger 73 is carried into engagement with the flange 43 of the drive dog due to the pressure engagement of the stud 76 with the finger 74. As tracking progresses, the finger 74 continually urges the dog 36 away from its preset position, but the dog does not move far enough to reach its extended operating position during a single turntable revolution. Each time the spur 40 comes around it contacts the lug 41 of the dog 36, but because the lug 41 has not moved outwardly sufficiently to be caught by the front edge of the spur 40, the spur merely wipes across the front surface of the lug 41 and pushes the dog 36 back toward its preset position. This is possible because the links 59 and 61 are slidably mounted to one another. The carried link 61 is longitudinally displaced relative to the carrier link 59 at each revolution. However, when the pickup arm enters the trip groove, leaving the sound track of the record, it moves much farther inward in a single revolution, carrying the crank arm and linkage 34 with it. Thus, the drive dog 36 is moved into its fully extended or operating position and the lug 41 is carried into the course of the spur 40. This takes place in a single revolution before the spur 40 can engage the front face of the lug 41 and move the dog 36 back to its preset position. Consequently, the lug 41 is engaged by the spur at a point remote from its tip, and the rotational force necessary to initiate the record changing cycle is transmitted to the gear through the dog 36 and the pivot pin 37. The spring resistance of the detent lever 27 is overcome by direct driving force, and the cycle is initiated.

Link 61 is restored to its preset relationship to the link 59 during movement of the tone arm in the trip groove because of the relative shortness of the slot 68 to the other slots in the links. During movement of the linkage to the left, the end of the slot 68 is carried into engagement with the post 17 where its movement is arrested while the carrier links continue to move to the end of their stroke, thereby rearranging the lings in their preset position ready for a repeat cycle.

The swingout mechanism 28 carries a reset arm or rod 77, and the carrier link is formed with an ear 78 projecting downwardly adjacent to finger 74. A notch 79 is thus provided at the level of the arm 77. By the time the link 59 is advanced to its outermost position, the notch 79 is carried into contact with the arm 77. Mechanisms deriving their motions from the gear 14 then lift the tone arm from the record and move it outward as described in the above mentioned Vistain patent. The swingout mechanism thus rotates the arm 77 counterclockwise (see FIG. 1) to move the links 59 and 61 back to their preset positions. Finger 73 is timed to return to its preset position slightly before the flange 43 is carried directly between the finger 73 and the post 17 by the gear 14. As a safeguard against possible collision between the vertical edges of the finger 73 and flange 43 due to imperfections in manufacture or adjustment, the latter is formed with the wing 46 so that a consequent camming operation between the wing and a finger 73 would take place to move one or both of the parts and protect against deformation or breakage of the parts. Also for safety spurposes the wing 44 opposite wing 46 is provided. Should a person arbitrarily or inadvertently turn the turntable counter to the direction in which it is driven by its motor after the mechanism is in its cycle, a camming action may take place between the wing 44 and the finger 73 to prevent breakage or deformation of the drive dog or carrier link or both.

Thus, the mechanisms which illustrate the invention herein described have been set forth in detail. Obviously, many substitutions and modifications to the specific disclosures herein might be made without departing from the spirit and intended scope of coverage of the appended claims. It is not intended to limit this coverage by the details of the disclosure, but only by the principal operating features that have been combined to produce the novel result herein obtained. Therefore, what is claimed is:

1. In an automatic record player having a cyclically drivable member from which motion is derived to manipulate a tone arm and drop successive records into playing position, on a turntable, the combination of driving means for said member, said member having a peripheral notch positioned adjacent said driving means during normal record playing operation, a radial projection from said driving means, a driving dog pivotally mounted on said drivable member adjacent said notch, said dog being disposed out of the course of driving engagement with said radial projection during normal record playing operation, and linkage means operatively associated with and arranged to derive motion from said tone arm including a link adapted to move at slow velocity during tracking of a record's sound grooves by said tone arm, said link engaging said dog during said tracking to move said dog toward said course, said dog being moved away from said course by frictional engagement with said projection once each revolution thereof until said tone arm enters said record's trip grooves and the movement of said dog is accelerated toward said course sufficiently to cause driving engagement of said projection with said dog and initiate rotational movement of said drivable member.

2. An automatic record player as set forth in claim 1 wherein said drivable member is a gear, said driving means is a pinion, and said dog is provided with a camming surface formed to overly the teeth of said gear when said dog has been moved into said course, said camming surface being engaged by the teeth of said pinion as said gear approaches completion of a rotation whereby said pinion teeth will move said dog axially inward to its preset position and out of the course of said projection by the time said gear has completed its record changing cycle.

3. An automatic record player as set forth in claim 1 which comprises, in addition, a swingout mechanism arranged to swing in one direction following the motion of said tone arm into said trip grooves, preset means on said swingout mechanism for engaging said linkage means when it has been displaced to initiate said rotational movement and urge said linkage backward to its original position at the beginning of said cycle, and a fixed member at the axis of said drivable member for cooperation with said link to limit its motion toward said dog in one direction and to a preset position in the other direction.

4. In an automatic record player comprising a drivable member formed with a notch at its periphery for association with a driver and a spur at the axis of a turntable during tracking of a record thereon by a pickup arm to which a crank is coupled for lateral movement therewith, the combination of a drive dog pivotally mounted on said drivable member and disengaged from said spur during record playing, a pair of links frictionally coupled to one another, the first of said links being associated with said dog and the second of said links being associated with said crank, said links being moved toward said dog at low velocity by engagement of said second link with said crank during said tracking to carry said first link into engagement with said dog and move said dog toward said spur, said spur being adapted to resist movement of said dog into its course by engaging it and urging it therefrom, said dog being displaced relative to said second link at each record revolution until said pickup arm reaches the trip groove and moves said dog at an accelerated velocity into the course of said spur before said dog may be so engaged, whereby said drivable member then receives an increment of motion from said spur to move said notch past said driver and establish driving relation between said driver and said drivable member and initiate a cycle of operation of the latter.

5. An automatic record player as set forth in claim 4 wherein said spur precludes the movement of said dog into its operating position by intermittently engaging it to press it from said spur's course and move said first link relative to said second link until said pickup arm enters said trip groove and said dog is swung at increased velocity to its operating position wherein said dog is engaged by said spur before said dog can be pressed out of the spur's course by said spur, said drivable member thereby receiving an increment of motion from said spur for moving said drivable member into driving relation with said driver, and preset means arranged to engage said driver adjacent said notch when said dog is in its operating position, whereby said dog may be preset by pressure engagement of driver with said preset means.

6. An automatic record player as set forth in claim 5 having a pair of links each having a slot formed to receive a guide member, said guide member having a neck portion for receiving said slots, said slots and said neck portion cooperating to confine one of said links in slidably supported relation to said other link and to arrange said links in staggered relation to each other, one of said links being operatively associated with said drive member and said other link being operatively associated with said crank, whereby said crank concurrently moves both links at slow velocity toward said dog during tracking of said sound groove and said one link presses on said driving member to swing it away from its preset position as the pickup arm approaches the trip groove but is precluded from entry into the orbit of said spur by being thereby pressed out of said course and said one link moved farther over said other link until said pickup arm enters said trip groove and said links are concurrently moved at an accelerated velocity sufficient for said one link to be operatively engaged by said spur before being urged inwardly out of its operatively engageable position.

References Cited in the file of this patent

UNITED STATES PATENTS

| | | |
|---|---|---|
| 2,571,466 | Metcalfe | Oct. 16, 1951 |
| 2,616,703 | Leonard | Nov. 4, 1952 |
| 2,983,515 | Vistain | May 9, 1961 |

FOREIGN PATENTS

| | | |
|---|---|---|
| 616,352 | Great Britain | June 20, 1949 |
| 675,900 | Great Britain | July 16, 1952 |